W. L. BLISS.
COUPLING FOR ELECTRICAL CONDUCTORS.
APPLICATION FILED MAY 9, 1907.
1,097,602.
Patented May 19, 1914.
4 SHEETS—SHEET 1.
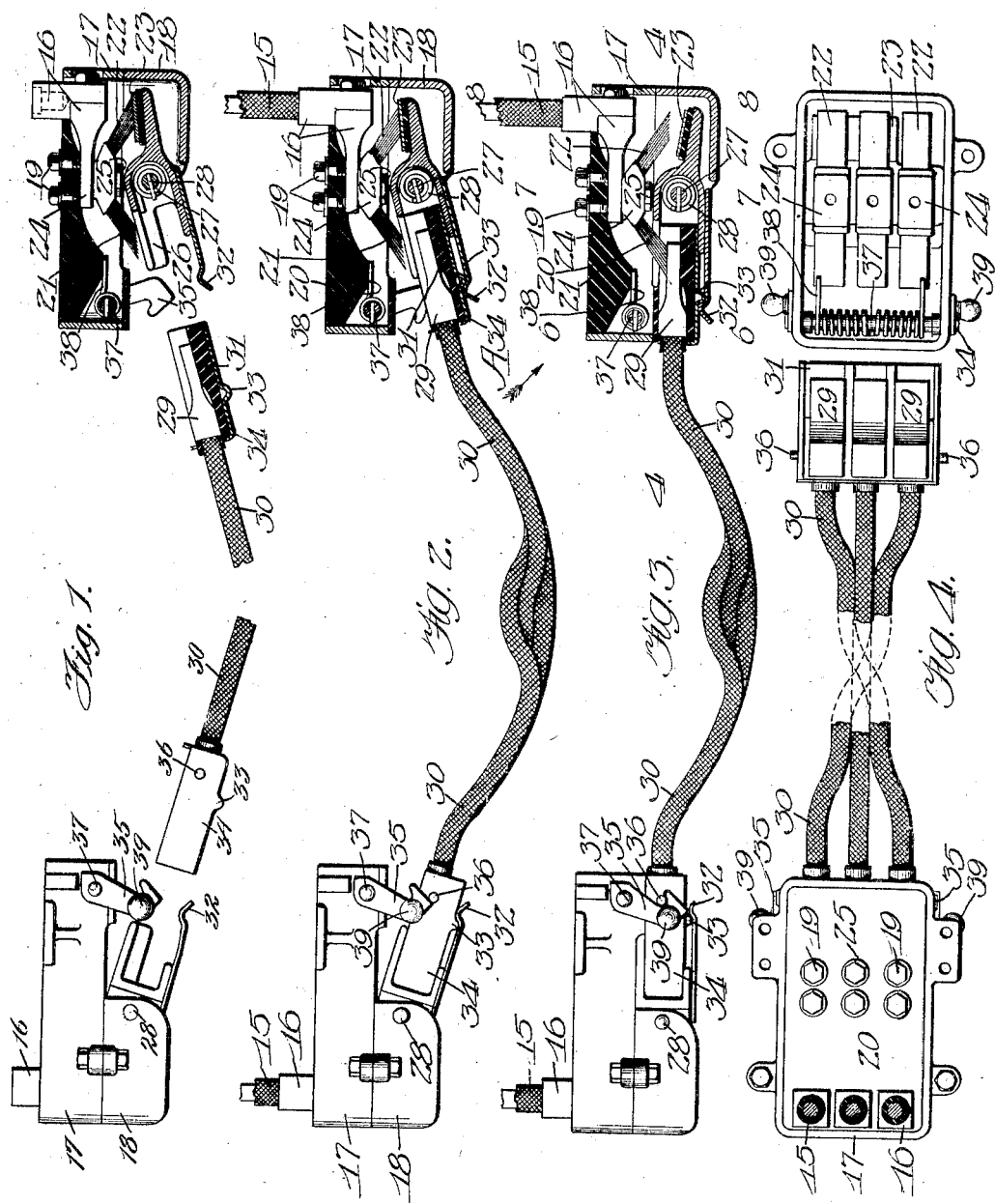
WITNESSES:
INVENTOR
William L. Bliss
BY
ATTORNEY.

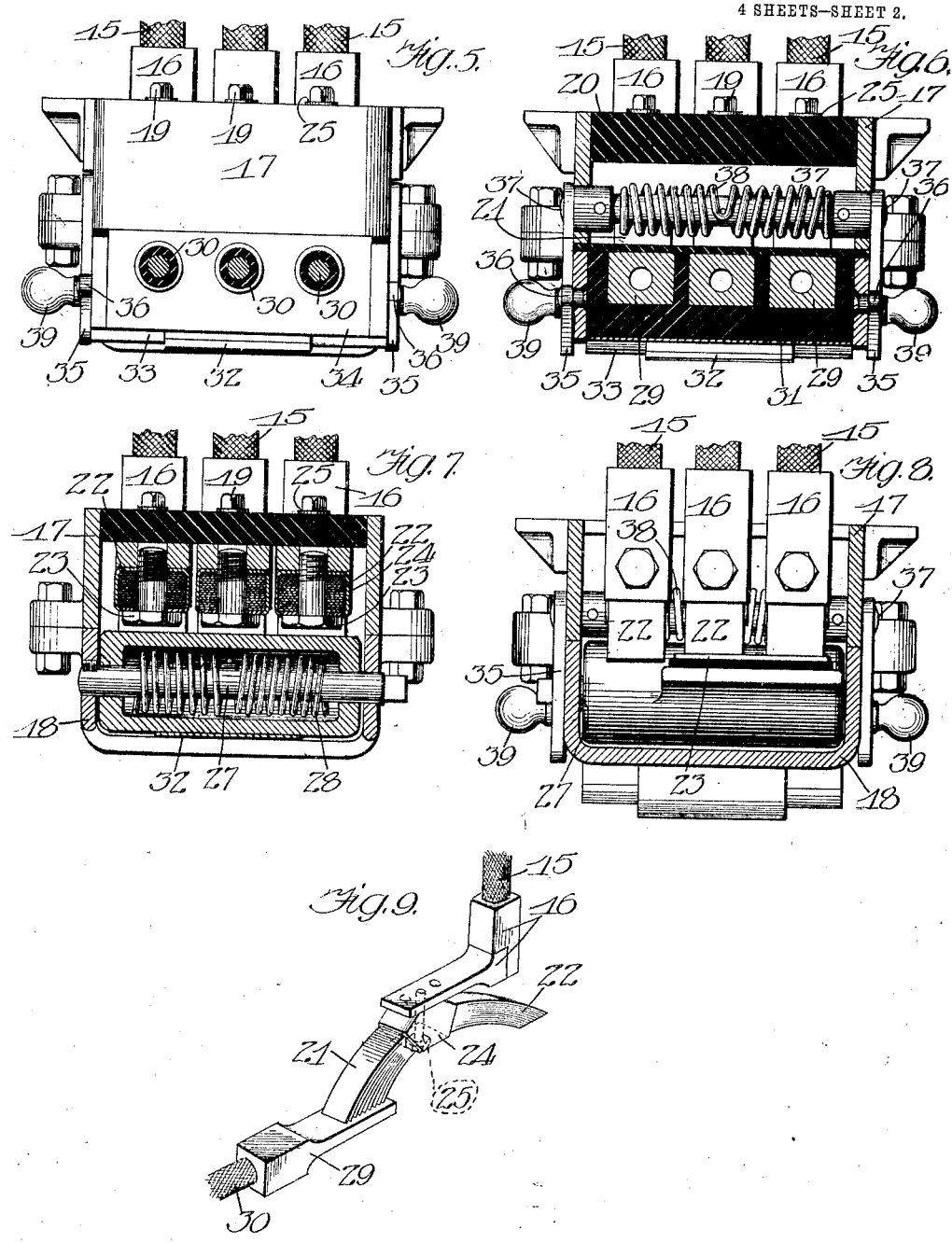

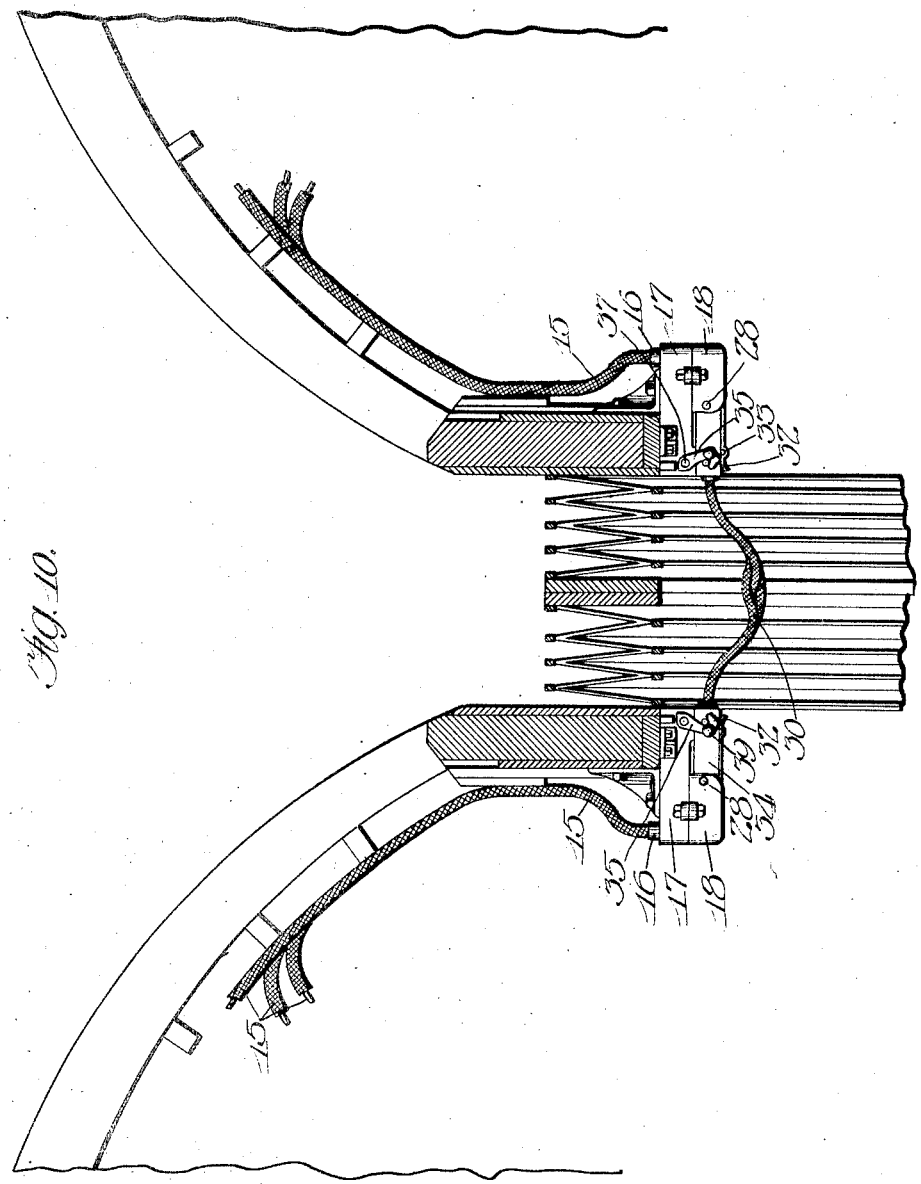

W. L. BLISS.
COUPLING FOR ELECTRICAL CONDUCTORS.
APPLICATION FILED MAY 9, 1907.
1,097,602.
Patented May 19, 1914.
4 SHEETS—SHEET 4.
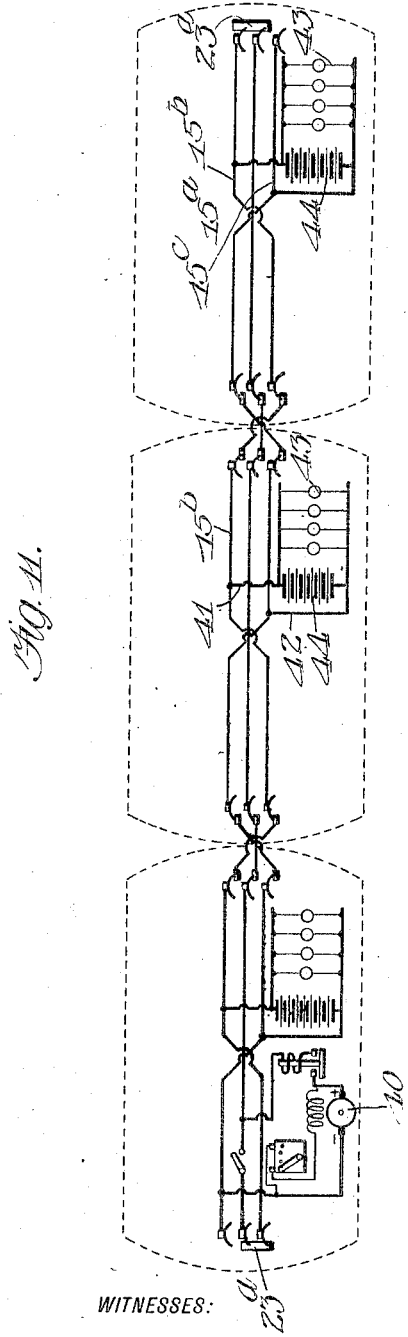
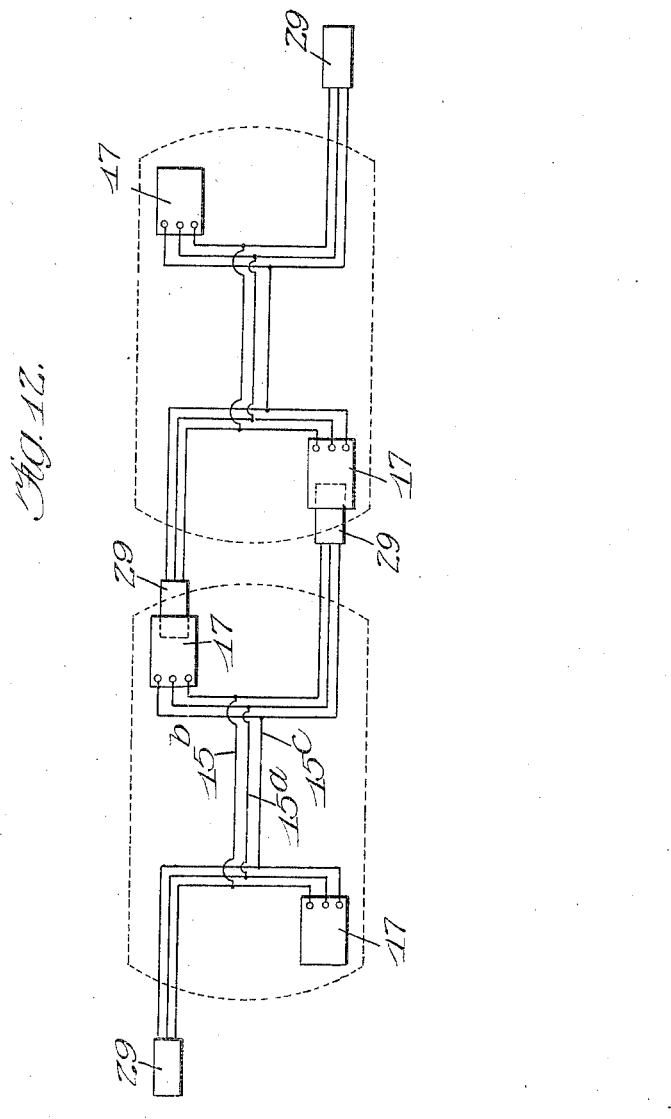
WITNESSES:
Robert H. Weir
Howard M. Cox
INVENTOR
William L. Bliss
BY:
Edwin B. H. Tower Jr.
ATTORNEY

UNITED STATES PATENT OFFICE.

WILLIAM L. BLISS, OF MILWAUKEE, WISCONSIN, ASSIGNOR, BY MESNE ASSIGNMENTS, TO THE UNITED STATES LIGHT AND HEATING COMPANY, OF NEW YORK, N. Y., A CORPORATION OF MAINE.

COUPLING FOR ELECTRICAL CONDUCTORS.

1,097,602. Specification of Letters Patent. Patented May 19, 1914.

Application filed May 9, 1907. Serial No. 372,740.

*To all whom it may concern:*

Be it known that I, WILLIAM L. BLISS, a citizen of the United States, residing at Milwaukee, in the county of Milwaukee and State of Wisconsin, have invented new and useful Improvements in Couplers for Electrical Conductors, of which the following is a full, clear, concise, and exact description, reference being had to the accompanying drawing, forming a part of this specification.

My invention relates to couplers or connectors for electrical conductors, and although the invention is applicable for the coupling of conductors under a wide variety of conditions, and for a great variety of purposes, it is especially useful when employed in connection with train lighting systems, and for that reason, I have chosen to illustrate the invention as embodied in a coupler for train lighting conductors.

In train lighting systems it is usual to employ three conductors or train lines running the length of the train, these conductors being usually known as the "end feeder", the "free wire", and the "jumper wire". I have, therefore, shown a coupler adapted to couple or connect conductors in sets of three. It will be understood, however, that the operation would be the same, and the construction would be analogous, if the coupler were designed to connect the ends of a number of conductors, greater or less than three.

The general object of the invention is to provide a coupler which may be readily coupled and uncoupled, which will afford good contact when coupled, and in which the contacting parts may be protected from the weather.

As applied to train lighting, one of the objects of the invention is concerned with the providing of an automatically closing end jumper.

Other minor objects are accomplished by various details of construction, which will be hereinafter explained.

In the accompanying drawings which illustrate an advantageous embodiment of my invention, Figures 1, 2, and 3, each give both a side and a sectional view of a coupler embodying my invention. The various views show the sequence of positions which the parts occupy during the act of coupling. Fig. 4 in the left portion of the figure, shows a top view of the main coupling member. At the right portion of the figure the view is taken on the line 4—4 of Fig. 3, Fig. 5 is an end view of the assembled coupler, Figs. 6, 7, and 8 are sectional views, taken respectively on the lines 6—6, 7—7 and 8—8, Fig. 3, Fig. 9 is a perspective fragmentary view, illustrating the relation of the conducting parts as they would appear if viewed in the direction of the arrow at "A", Fig. 3, Fig. 10 illustrates the application of this coupler to the cars of a railway train, a portion of the ends of the cars being shown, Fig. 11 is a diagrammatic plan of a system of car lighting to which the coupler in the form here illustrated is particularly adapted, and Fig. 12 illustrates another manner of employing the coupler in a train lighting system.

Similar numerals refer to similar parts throughout the several views.

For convenience in describing the mechanical construction of the coupler in the form here shown, the two chief coupling members will be referred to as the "stationary" and "removable" members, the stationary member being, in the present instance, larger than the removable member and being attached to the car body. The relative sizes, however, are immaterial, and it is chiefly a matter of convenience which determines which of the coupling members shall be attached to the car.

Now, referring to the drawings wherein I have illustrated a preferred form of coupler, the main distributing conductors, or train lines, 15, are attached to the car in any suitable manner, for example, to the car roof, as shown in Fig. 10. Each conductor terminates in a block 16, which, for convenience of manufacture, is preferably made in two parts. Said blocks are of conductive material, preferably metal, and are secured in the casing of the main coupling member. Said casing is preferably formed in two parts 17 and 18, bolted or otherwise fastened together. Blocks 16 are secured by means of the cap screws 19 or other suitable devices to the insulating block 20 fastened in any appropriate manner to the part 17. Each block 16 is in electrical connection with a terminal contact 21, which in the preferred form consists of a plurality of copper or other conducting strips, constituting what is commonly known as a "laminated" contact.

In the form of car lighting coupler here shown, each block 16 is also in electrical connection with a terminal contact 22 intended to connect with an "end jumper" 23 in a manner hereinafter described. By preference the contacts 21 and 22 are integral, being formed of the same continuous strips or leaves. The leaves of terminals 21 and 22 are secured to block 16 in any suitable manner, the preferred means being a band or strap 24, and a cap screw 25, for holding the leaves rigidly in contact with each other and with the block 16.

The casing part 18 carries a receiving frame 26, which in the preferred construction, is mounted upon the pivot pin 27, and is urged by means of the spring 28 to rotate outward from the part 17, that is, spring 28 tends to rotate frame 26 to the position shown in Figs. 1 and 2. Frame 26 is adapted to receive and retain the secondary member of the coupler, which will now be described. Said removable member, which, in the present construction, is designed to couple up three movable with three stationary conductors, contains three terminal blocks or contact pieces 29, each one of which is in electrical connection with its respective one of the connecting cables 30. Said secondary member also includes means such as the insulating block 31 for insulating the pieces 30 from each other and from exterior objects. In order that the receiving frame 26 may retain the removable coupling member when the latter has been inserted, a latch or retaining spring 32 is mounted upon said frame and adapted to engage the ridge or boss 33, formed in the plate 34, which constitutes a part of the removable coupling member. The mounting of the latch 32 upon the receiving frame, instead of upon the removable coupling member, is largely a matter of convenience, and it is obvious that the parts might be reversed, so that the latch would be upon the removable member, and the boss or ridge 33 upon said receiving frame. The essential characteristic is that the member 26 and the removable coupling member are so relatively constructed that one may be brought into and out of mechanical connection with the other, and that when thus in mechanical connection may be together moved relatively to the stationary coupling member, to establish the connection between the terminals 29 and the terminals 21. This effect is produced in the following manner: The parts are so constructed and arranged that when the removable coupling member is in mechanical connection with the frame 26, by moving said frame to closed position, Fig. 3, the face of terminal 29 will be forced against the terminal 21, thus completing the electrical connection between them. The advantage of this preferred construction, in which the frame 26 is pivoted to the casing part 18, is that when said frame with terminal 29 therein is rotated from open position, shown in Fig. 2, to closed position, shown in Fig. 3, said terminal 29 will be forced against the ends of said laminated terminal 21, and there will be, in addition to a movement toward each other, a movement of the ends of the laminations of the terminal 21 along the face of the terminal 29, which will cause the parts to rub or grind or wipe against each other and thereby produce good contact. The movement is such, also, as to produce a spreading of the ends of the laminations as indicated at the left portion of Fig. 9. The same effect is produced when the end jumper 23 is brought into contact with the terminals 22. I do not wish to be limited, however, to a construction in which the member 26 is pivoted to the casing 18, as other forms of mechanical connection permitting relative movement might be substituted.

It has already been mentioned that in the preferred design the spring 28 urges the frame 26 to open position. In this design it is consequently necessary to provide means for holding said frame in closed position against the force of said spring. The preferred means for accomplishing this are latches, which consist of hooks or dogs 35, adapted to engage the pin 36, projecting laterally from the auxiliary coupling members, best shown in Figs. 1, 2, and 3. Said hooks are preferably pivoted upon the casing 17 by means of the shaft 37, which is urged by means of a spring 38 to hold the hooks 35 in engagement with pin 36. I am aware that other forms of spring urged latches may be substituted for the ones here illustrated, but the ones here shown are desirable because efficient in operation and simple in construction. It is desirable that knobs or handles 39 be provided on hooks 35 in order that the latter may be withdrawn from pins 36, when it is desired to uncouple the coupler. I desire to call attention to the fact, however, that it is not necessary to release the hooks 35 by hand in order that the coupling members may be separated. The point of the hook in my improved form of coupler is so shaped that in case the train should break in two when the coupler is in coupled position, the coupling members may be pulled apart or "cut" without in any way damaging the device. In order to permit this forcible uncoupling, the points of the hooks 35 are so shaped that when in closed or set position, shown in the lower portion of Fig. 3, the pins 36 may slip from under said hooks when a longitudinal pull is exerted. This manner of uncoupling, however, usually occurs only in an emergency, and the parts are so designed that the members will not be uncoupled in this manner unless considerable force be exerted. When the members are intentionally uncoupled by hand, it is merely necessary to throw back the hooks 35, when the frame 26 will of itself tend to swing to open position, after which the removable coupling member may be easily withdrawn.

The chief characteristics of the coupler as so far described, are applicable to couplers used in various situations, and I will now describe a feature of the invention which renders this illustrated form of coupler especially adapted to train lighting systems.

It will be understood by those skilled in the art of car and train lighting that if only two main train lines were employed leading from a generator or other source of electrical energy at one end of the train, and the car mains were connected across them in parallel, the car mains more remote from the source of electrical energy would receive energy at a lower voltage than the car mains nearer to said source. To avoid this unequal distribution and to supply all of the car mains with electrical energy at the same voltage, three train lines are employed which are known as the "jumper wire," "end feeder," and "free wire," as hereinbefore previously indicated.

For the purpose of explanation I will now refer to the diagram, Fig. 11, and where necessary will employ letters as exponents to indicate the correspondence of the mechanical parts with the parts in said diagram. The generator 40, or other source of electrical energy, is located at one end of the train, in the engine tender or baggage car, or other car common to most trains. From said generator, the end feeder 15$^a$ extends the entire length of the train and is connected at the far end of the train to the jumper wire 15$^b$, which leads to one of the two car mains 41 and 42, in each car. The free wire 15$^c$ is connected to the remaining car mains. The lamps or other translating devices 43 of each car are connected to said car mains 41, 42; and a storage battery 44 is also connected to said car mains in the systems in most common use. An examination of a system connected up in this manner will show that each pair of car mains will have an equal voltage impressed upon it, but in such a system it is necessary that the end feeder be always connected to the jumper wire at the end of the train remote from the generator.

It is obvious that the connection between the end feeder and the jumper wire should be made automatically at the exposed end of the car farthest from the main source of electrical supply. It is obvious also that such connection should be broken when another car is attached. I accomplish this automatic connection and disconnection by mounting the jumper 23 upon the frame 26 in such position as to engage the proper pair of terminals 22, when the receiving frame 26 is in open position, and disengage them when the receiving frame is in closed position. Said jumper is of course properly insulated from the frame 26. The parts are so proportioned that when the frame 26 is in closed position as shown in Fig. 3, the end jumper will be removed from said terminals 22 on the ends of the jumper wire 15$^b$, and end feeder 15$^a$. As a result of this construction, when frame 26 is in closed position with the terminals 29 in engagement with the terminals 21, the end jumper 23 will be out of contact and the circuits will be completed with the proper train lines through the blocks 16; but when said receiving frame 26 is in open position and the terminals 29 are out of engagement with the terminals 21, the end jumper 23 will be in contact with two of the terminals 22. Thus the connection between the end feeder and the jumper wire is automatically established when the frame 26 is open, and broken when said frame is closed. As above pointed out, said receiving frame 26 will move to open position automatically, whether the removable coupling member has been withdrawn from said receiving member, either intentionally by hand or accidentally by reason of the separation of the cars.

Referring to Fig. 12, the construction of the coupler parts is the same as above described, but instead of employing but one stationary and one removable coupling member at each end of the car, two are employed at each end. Near the end of the car the end feeder 15$^a$, jumper wire 15$^b$ and free wire 15$^c$ divide into two branches and lead to each side of the car. At one side they lead to a stationary coupling member which is fastened to the car body and at the other side they lead to a removable coupling member, the conductors being long enough to permit the removable member to reach and enter the stationary coupling member at the end of the adjacent car. With this method of wiring, which is otherwise similar to the one previously described, the efficiency of contact does not depend upon one coupler but upon two, and there are no loose cables which may be lost or removed from the car. The wires are all permanently connected to the car so that all parts of the system are at all times present and ready for use.

Having thus described my invention, what I claim as new and desire to secure by Letters Patent is—

1. A coupling member having a suitable contact terminal, a movable receiving frame carried by said coupling member, another coupling member having a contact terminal and being adapted to be placed in said receiving frame, said receiving frame being movable to bring the terminal of the second mentioned coupling member into engagement with the terminal of said first mentioned coupling member.

2. A coupling member having a suitable contact terminal, a receiving frame carried by said coupling member, another coupling member having a contact terminal adapted to be inserted into said receiving frame, said receiving frame being pivoted to the first mentioned coupling member and adapted to bring the terminal of said second mentioned coupling member into engagement with the terminal of said first mentioned coupling member.

3. In a coupler for electric conductors, the combination of a coupling member having a contact terminal consisting of a plurality of leaves of conducting material, a frame carried by said coupling member, another coupling member having a contact terminal and being adapted to be detachably attached to said frame, said frame being pivoted to the first mentioned coupling member and being adapted to bring the terminal of said second mentioned coupling member into engagement with the extremities of the leaf contact of said first mentioned coupling member.

4. In a coupler for electric conductors, the combination of a coupling member having a contact terminal consisting of a plurality of yielding metallic leaves, a frame carried by said coupling member, another coupling member having a contact terminal adapted to be detachably attached to said frame, said frame being pivoted to the first mentioned coupling member and adapted to bring the terminal of said second mentioned coupling member forcibly into contact against the ends of the yielding leaves of the first mentioned terminal, and releasable means for holding the terminal of said second coupling member forcibly in engagement with the yielding leaves of said first mentioned coupling member.

5. In a coupler for electric conductors, in combination, complementary coupling members each having suitable contact terminals, means for mechanically connecting said coupling members and permitting relative movement of the two while connected for moving the terminals thereof into and out of electrical contact with each other, means for urging said members into position to hold the terminals out of contact with each other and releasable means for holding said coupling members in position to retain said terminals in contact with each other.

6. In a coupler for electric conductors, in combination, complementary coupling members each having suitable contact terminals, one of which consists of a plurality of yieldable strips of metal, means for mechanically connecting said coupling members and permitting relative movement of the two while connected for moving the terminals thereof into and out of electrical contact with each other, means for urging said coupling members into position to hold the respective terminals out of contact with each other, and releasable means for holding said coupling members in position to forcibly hold the respective terminals in contact with each other.

7. In a coupler for electric conductors, in combination, complementary coupling members, each having a suitable contact terminal, means whereby said members may be mechanically connected and moved relatively to each other after being mechanically connected to make electrical connection between said terminals, and means for holding said complementary members in a position where electrical connection is made between the respective terminals, said holding means being adapted to yield and permit the separation of said contact terminals upon the exertion of a pull exerted upon said coupling members in opposite directions.

8. In a coupler for electric conductors, the combination of a stationary coupling member, a removable coupling member, a member pivoted to said main coupling member, said pivoted member and said secondary coupling member being interfitting and separable, and said stationary and removable coupling members each being provided with contact terminals, said contact terminals being in electrical connection with each other when said pivoted member is in one position and said terminals being out of electrical contact with each other when said pivoted member is in another position, and means for holding said contact terminals in electrical contact with each other.

9. In a coupler for electrical conductors, the combination of two separate coupling members, each provided with contact terminals, one of which is laminated with the extremities of its laminations exposed, a frame adapted for detachable mechanical attachment to one of said coupling members, said frame being pivoted to the other of said coupling members and adapted to bring one of said terminals into and out of engagement with the ends of the laminations of the other of said terminals.

10. In a coupler for electrical conductors, the combination of two separate coupling members, each provided with contact terminals, one of said terminals having a flexible laminated contact with the extremities of its laminations exposed, a frame adapted for detachable mechanical attachment to one of said coupling members, said frame being pivoted to the other of said coupling members and adapted to bring one of said terminals obliquely toward and simultaneously along the ends of the laminations of the other of said terminals, and means for holding said terminals forcibly in electrical contact with each other.

11. A coupler for completing the electrical connection between a plurality of main lines, said coupler comprising a stationary and removable coupling member, said removable coupling member being provided with a single contact terminal for each of the main lines, and the main coupling member being provided with two terminals for each of the main lines, a frame pivoted to said main coupling member and adapted for detachable attachment with said removable coupling member, said pivoted frame being provided with an end jumper and being adapted to occupy two positions, one position for holding said end jumper in contact with two of the terminals of said stationary coupling member, and another position for holding the terminals of said removable coupling members in contact with the remaining terminals of said removable coupling member, said end jumper in the last described position of said frame being out of contact with said terminals.

12. A coupler for completing the electrical connection between the three main lines of a train lighting system, to-wit, the end feeder, jumper wire, and free wire, said coupler consisting of two principal coupling members, one of which is provided with three terminals, one for each of the main lines, and the other of which is provided with at least five terminals, one for each of the main lines, and one for the jumper wire, and one for the end feeder; in combination, with a member provided with an end jumper and pivoted to the coupling member which is provided with said five terminals, said pivoted member being adapted for detachable mechanical attachment with the coupling member having three terminals, said pivoted member being adapted to occupy two positions, one for holding said end jumper in contact with the terminals of the jumper wire, and end feeder, and in the other position for holding the terminals of the other coupling member in contact with the terminals of the three main lines.

13. A coupler for completing the electrical connection between the three main lines of a train lighting system, to-wit, the end feeder, jumper wire, and free wire, said coupler consisting of two principal coupling members, one of which is provided with three terminals, one for each of the main lines, and the other of which is provided with at least five terminals, one for each of the main lines and one for the jumper wire, and one for the end feeder; in combination with a member provided with an end jumper and pivoted to the coupling member which is provided with said five terminals, said pivoted member being adapted for detachable mechanical attachment with the coupling member having three terminals, said pivoted member being adapted to occupy two positions, one for holding said end jumper in contact with the terminals of the jumper wire, and end feeder, and in the other position for holding the terminals of the other coupling member in contact with the terminals of the three main lines, means for urging said frame into position to hold the end jumper in contact with the terminals, and releasable means for holding said frame in the opposite position.

14. In a coupler for electrical conductors, the combination of separable complementary coupling members having contact terminals, the terminal on one of said members being formed of laminations and adapted to yield as said coupling members are being brought to closed position, means for detachably hinging said coupling members together to permit relative movement of the terminals while said coupling members are mechanically connected, and automatically releasable means holding said coupling members in closed position.

15. In a coupler for electrical conductors the combination of two coupling members having contact terminals, the terminal on one of said members being laminated and resilient, the exposed extremities of the laminations forming a contact surface and one of the said members having a hinged frame adapted to receive the other member whereby one of said terminals may be swung toward and from the other to produce rubbing contact when the parts are being brought to closed position.

16. In a coupler for electrical conductors, the combination of two separate coupling members, each provided with a contact terminal, one of which is laminated with the extremities of its laminations exposed and forming a contact surface and means adapted to receive one of said coupling members for detachably hinging said coupling members together whereby one of said terminals may be swung into contact with the ends of the other terminal.

17. In a coupler for electrical conductors, the combination with two separate coupling members each provided with a contact terminal, one of which is laminated with the extremities of its laminations exposed and forming a contact surface, said laminated terminal being yieldable, means adapted to receive one of said coupling members for hinging said coupling members together, the pivot of said hinge constituting a fulcrum about which the parts may be swung in forcing the contact terminals together, and releasable means for holding said terminals in forcible contact with each other.

18. In a coupler for electrical conductors, the combination of separable coupling members, each having a contact terminal, one of said terminals comprising a laminated brush, the exposed ends of the laminations forming a contact surface, means for separably hinging one of said terminals to the other, and releasable hooks for holding said coupling members in closed position to thereby forcibly maintain the terminals in contact with each other.

19. In a coupler for electrical conductors, the combination with complementary coupling members adapted to be brought into mechanical contact, contact terminals carried by said members, one of said terminals comprising a laminated brush tending to force said members apart, means for mechanically connecting said members and permitting relative movement thereof to bring said terminals into contact, means for locking said members to maintain contact between said terminals, said members adapted to separate automatically upon a pull being exerted between the same.

20. In a coupling member having laminated contact terminals, a receiving frame pivotably secured to said coupling member, a contact on said frame adapted to bridge certain of the terminals when the frame is in open position, a removable coupling member having contacts thereon adapted to be inserted in said receiving frame, and means to hold the receiving frame in closed position when the removable coupling is placed therein.

In witness whereof, I have hereunto subscribed my name in the presence of two witnesses.

WILLIAM L. BLISS.

Witnesses:
 HOWARD M. COX,
 J. C. LOOMIS.

---

Copies of this patent may be obtained for five cents each, by addressing the "Commissioner of Patents, Washington, D. C."